Oct. 28, 1952         D. A. SCHROCK            2,615,941
                       MOTORIZED PULLEY
Filed Jan. 9, 1951                        3 Sheets-Sheet 1
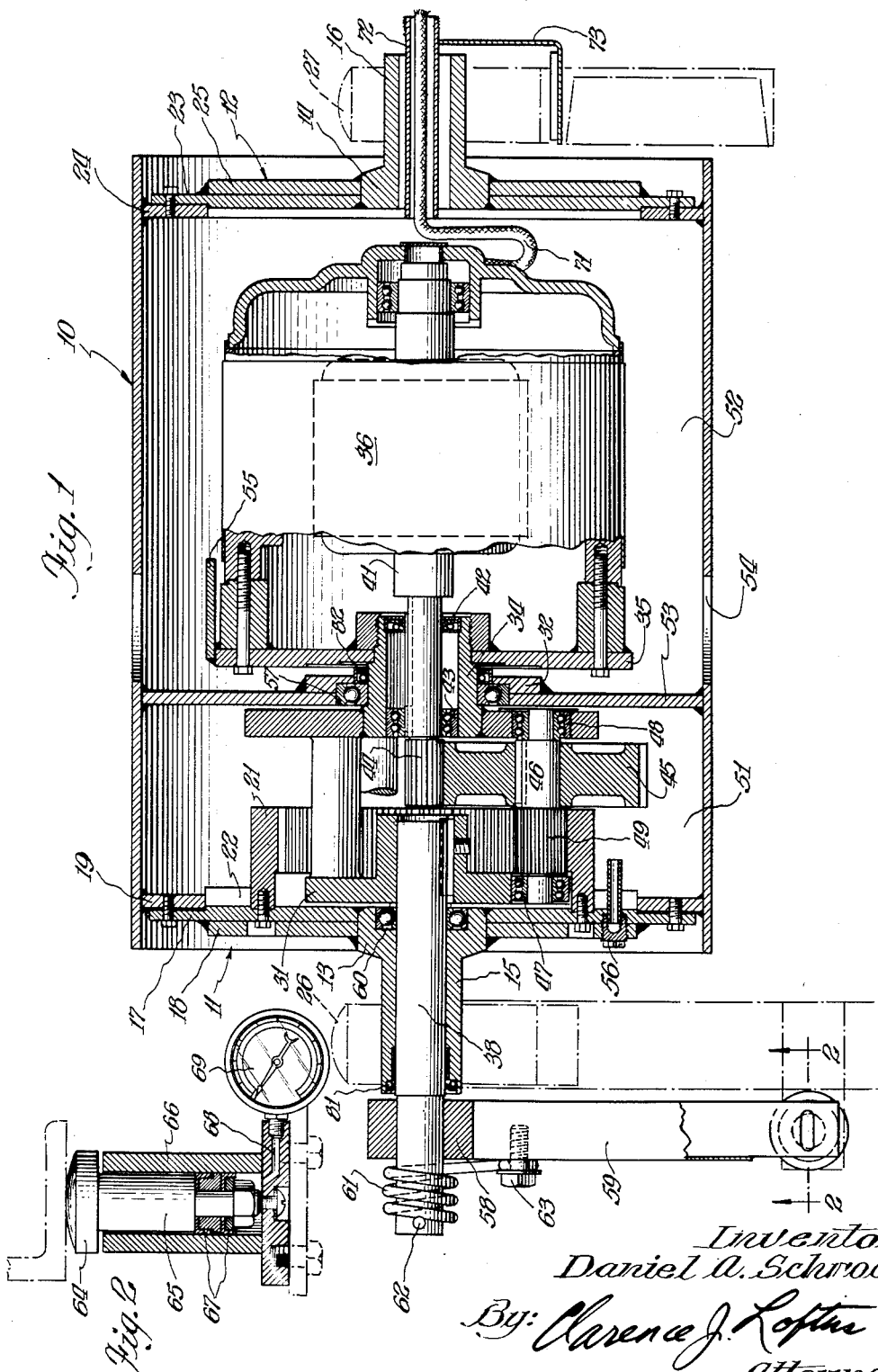
Inventor:
Daniel A. Schrock
By: Clarence J. Loftus
Attorney.

Oct. 28, 1952     D. A. SCHROCK     2,615,941
MOTORIZED PULLEY
Filed Jan. 9, 1951     3 Sheets-Sheet 2
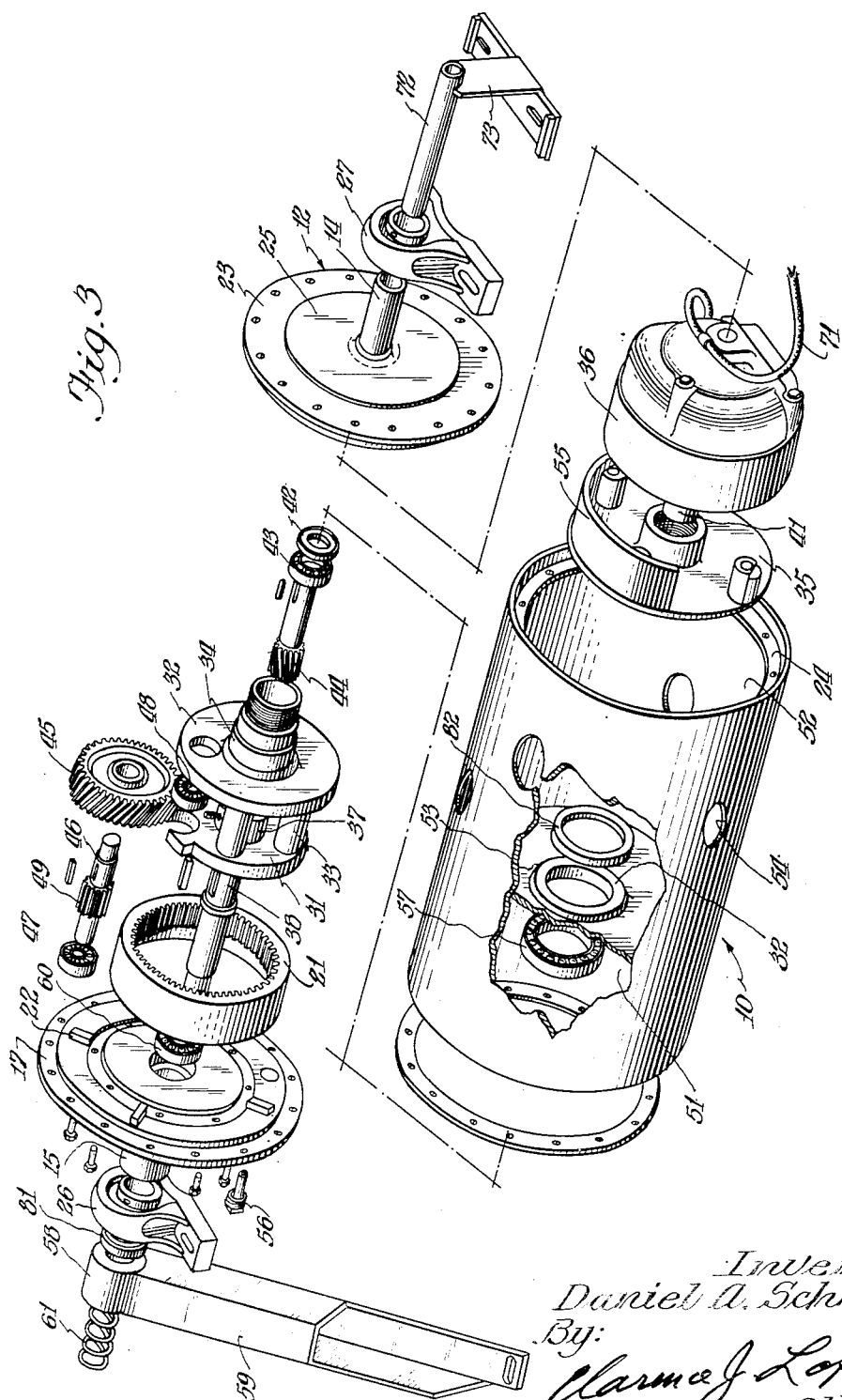
Inventor:
Daniel A. Schrock
By:
Clarence J. Loftus
Attorney.

Oct. 28, 1952     D. A. SCHROCK     2,615,941
MOTORIZED PULLEY
Filed Jan. 9, 1951     3 Sheets—Sheet 3
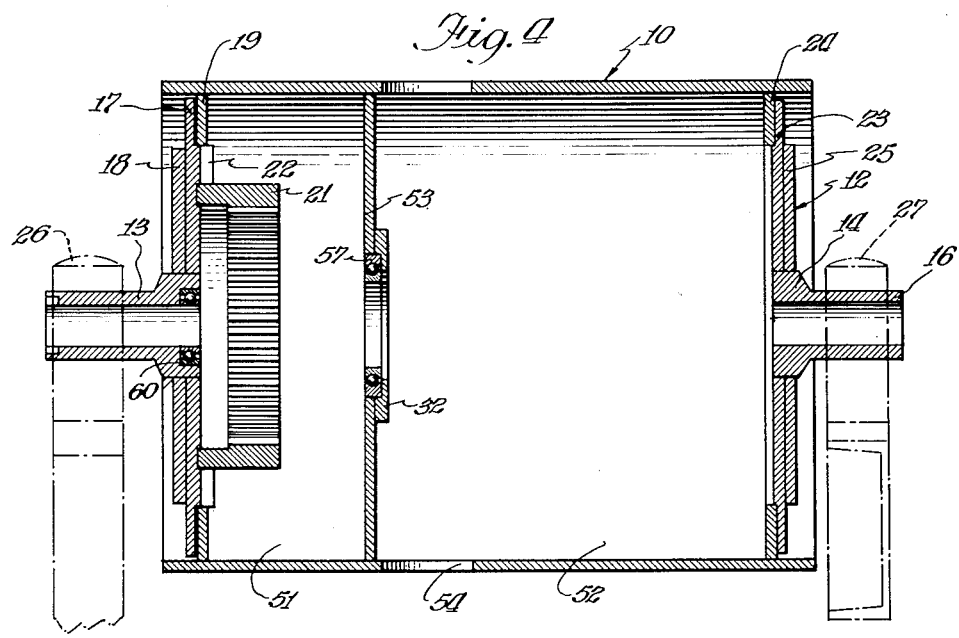
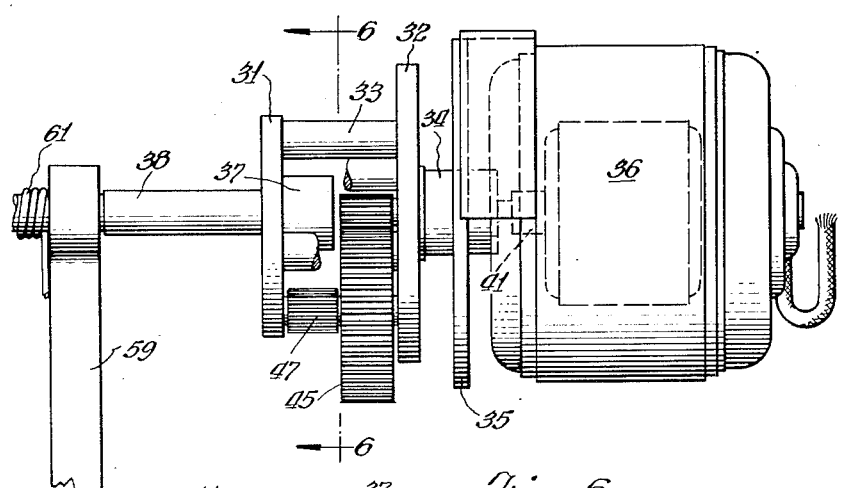
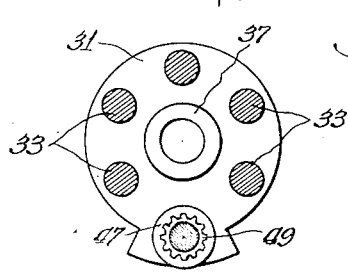
Inventor:
Daniel A. Schrock
By: Clarence J. Loftus
Attorney.

Patented Oct. 28, 1952

2,615,941

UNITED STATES PATENT OFFICE 2,615,941

MOTORIZED PULLEY

Daniel A. Schrock, Boise, Idaho, assignor to Idaho Sprocket and Machine Works, Boise, Idaho, a co-partnership Application January 9, 1951, Serial No. 205,064

3 Claims. (Cl. 172—36)

This invention relates to motorized pulleys and deals particularly with improvements rendering such pulleys practicable for extremely heavy duty equipment. More specifically, it discloses a motorized pulley of simplified construction yet of unusual strength and rigidity, so that it is suitable for use as a head pulley for heavy duty conveyor systems, particularly conveyor belts employed in handling materials such as coal, rock or mineral ores.

It is common knowledge that there have been in the prior art many proposals to provide pulleys, hoisting drums and the like with a self-contained driving motor, but it is equally well known that the structures which have been proposed for this purpose in the past have been subject to certain rather well defined limitations, with the result that equipment of this kind heretofore devised has not heretofore shown itself to be practicable for extremely heavy duty applications wherein the pulleys (and the frames and bearings on which they are mounted) are subjected to the loads, shocks, impacts and extreme stresses encountered in material handling equipment.

There appear to be several underlying reasons for this. For one thing, the motorized pulleys heretofore developed have been in most case quite complex and delicate and, in some instances, at least have been so designed that the extreme lateral strains or shocks imposed on the pulley drum by the tension of the belt and by the periodic impacts of large rocks striking the pulley surface could be transmitted to the motor or speed reducer housings or shafts, or to other equally delicate parts of the unit. Notwithstanding this, most motorized pulleys of the prior art are so designed that they are expensive to manufacture, while at the same time are so assembled as to be difficult to repair or service. It also appears that their design and construction has more often than not been such as to require the use of external collector rings and brushes to energize the internal motor. This obviously renders such a pulley nearly useless for material handling purposes where such delicate exterior parts would not only soon be ruined by dust and grit but would be extremely subject to breakage due to falling pieces of rock, ore, etc.

In other designs of the equipment, the parts have been so related as to present very difficult problems in construction and in maintaining proper alignment of the parts. Another factor (of possibly even greater practical importance in connection with heavy duty equipment) arises from the fact that the motorized pulleys heretofore devised, at least insofar as known to this applicant, have been of such design and construction that they require bearings or bearing mountings of special design or construction, or that they require special reinforcements or strengthening of their mounting frames in order to function in a satisfactory manner. Obviously such equipment is valueless from a commercial standpoint since to be acceptable to the trade it is essential that any proposed motorized pulley be quickly interchangeable with ordinary conventional pulley drums, without further modifications of the conveyor.

The net result has been that while the obvious advantages of providing a motorized head pulley for a material handling conveyor, for example, have been fully recognized, it has nevertheless been a rather impractical expedient with motorized units of the types heretofore devised. The result is that in the present commercial development of the art the pulleys employed in material handling conveyors are in almost all instances of conventional construction, powered by an exterior motor and speed reducer.

It is the general aim of the present invention to provide a motorized head pulley for a heavy duty material handling conveyor wherein the several coacting parts of the pulley are so related to each other as to achieve all of the advantages inherent in a motorized pulley, yet to do this without incurring the disadvantageous features of motorized pulleys of the types heretofore proposed. This involves several aspects. For one thing, it involves the provision of a motorized pulley so designed and constructed that it may be satisfactorily mounted in conventional bearings or pillow blocks of the same identical type and construction as are ordinarily used with equipment having pulley drums and axles of the conventional type.

In addition to this, it is essential that the motorized pulley be of such design that it does not impose any torque forces on the bearing structures which carry it, and does not bring about any twisting strains which might tend to flex the frames on which the bearings are mounted or cause misalignment of the bearings under severe conditions of loading or at the instant of violent impact. In this connection, it may be well to explain that in heavy duty material handling equipment, the necessity for maintaining a reasonable weight in the conveyor frames prevents the use of any bracing not absolutely necessary for satisfactory operation. It follows that to be satisfactory for its purpose, a motorized pulley must be of such design and construction that it maintains all of the characteristics of rigidity inherent in a simple drum and axle, and thus achieves its purpose without imposing any twisting strains on its bearings or on the frames by which the bearings are carried.

It is a further object of the invention to provide a motorized pulley wherein the driving mechanism (that is, the motor, speed reducer and related parts), are of such construction and so related to the other parts of the pulley that these parts are not at any time subject to any lateral load such as may be imposed on the pulley by the tension of the conveyor belt or by the shock of impact of large rocks, etc. striking the pulley drum. By this expedient the relatively delicate castings characteristic of most commercial motors are protected against breakage, and the rotary parts of the motor and speed reducer are relieved of any stresses which might otherwise cause deviations from perfect alignment and thus bring about unnecessary friction and wear in the various operating parts of the unit. This makes it entirely practicable to drive the unit by a motor of conventional design, and eliminates any need of a special motor or special motor housing, as are often required by motorized pulleys of prior types.

A still further object of the invention is the provision of a driving unit for a motorized pulley wherein the driving unit consists of a speed reducer and an electric motor coupled to each other by a relatively small threaded sleeve, so that the motor is supported wholly on the speed reducer, but may be isolated therefrom by an oil seal and baffle or bulkhead within the pulley drum, with the result that the entire driving unit may be supported at two points only, so that it is to a certain extent self-aligning and not unduly affected by minor inaccuracies of alignment.

In short, the present invention proposes to provide a motorized pulley wherein the pulley drum, end plates and journals operate as a single rigid unitary external frame, and thus function as the equivalent of a conventional drum and axle in the sense that these parts support the entire lateral load imposed upon the pulley and are the only parts subjected to the shock of any impact against the drum surface. The driving unit, on the other hand, is so designed and so related to the pulley drum that it is subjected to no lateral load whatsoever, but carries only the torque load of the pulley. In short, this invention proposes to provide a motorized pulley wherein the exterior drum, end plates and journals "pack the load" as far as lateral strains are concerned, and thus leave the driving unit free to develop the torque required without any lateral stresses which might tend to cause breakage, increase friction, or cause undesirable deviations from proper alignment which would bring about excessive wear.

The foregoing objects are accomplished in the present invention by the provision of a motorized pulley wherein the pulley drum, end plates and journals are permanently bolted together so that they function as a single integral piece and thus have adequate rigidity to maintain the journals in perfect alignment, even under the many extreme and variable lateral loads to which they are subjected. With such a construction, these loads are applied to the bearings in a lateral direction only and without any twisting moments of force. The driving unit of the pulley is mounted within this drum, but forms no part of the supporting structure thereof, so that it is subjected to torque loads only.

A preferred embodiment of the invention is illustrated in the drawings of this specification, wherein:

Figure 1 is a longitudinal sectional view through a head pulley of the type contemplated herein;

Figure 2 is a detail view of a hydraulic cylinder associated with the torque arm of the pulley to provide a weighing device for the material being handled in the conveyor belt, the view being taken substantially on the plane of the line 2—2 of Figure 1;

Figure 3 is an exploded view of the pulley assembly shown in Figure 1;

Figure 4 is a detail cross sectional view of the "frame" or load carrying structure of the pulley, with the driving unit removed;

Figure 5 is a side elevation of the driving unit; and

Figure 6 is a detail sectional view through the speed reducing section of the driving unit, the view being taken on the plane of the line 6—6 of Figure 5.

The pulley comprises a cylindrical drum 10 having end plates 11 and 12 in which hub portions 13 and 14 are mounted. The hub portions have outwardly extending aligned stub shafts or journals 15 and 16 integral therewith. The end plate 11 consists of a pair of circular discs 17 and 18 welded to each other and welded to the hub 13, with the outer periphery of the disc 17 removably bolted to a ring 19 welded on the inside of the drum 10 adjacent the left end thereof. The disc 17 carries a ring gear 21 and centering lugs 22, so that the entire end assembly functions as a single rigid, unitary plate. Similarly, the end plate 12 consists of an inside disc 23 bolted to the ring 24 on the drum 10 with a central reinforcing disc 25 to add rigidity to the structure. Thus, when the parts are assembled, the drum, end plates and journals function as a unitary frame which is extremely rigid and which provide a pulley which may be mounted in any conventional bearings or pillow blocks, such as represented by the bearings 26 and 27.

The manner in which these frame parts are assembled and mounted is best illustrated in Figure 4, from which it will be seen that the parts thus described provide a complete pulley adapted to mounting in conventional bearings, and designed to adequately support any lateral loads such as might be imposed upon it by the strain of the conveyor belt.

The driving unit of the device is an entirely separate mechanism as illustrated in Figure 5. This unit consists of a speed reducer having a frame composed of end plates 31 and 32 joined by a plurality of integral posts 33 extending therebetween. The end plate 32 carries a fixed sleeve 34 which projects therefrom, and has a threaded end portion on which the supporting plate 35 of an electric motor 36 may be mounted. The opposite end plate 31 of the frame has a central hub 37 in which a torque shaft 38 is mounted, with the torque shaft projecting to the left as viewed in the drawings.

Thus, from Figure 5 of the drawings it will be apparent that the driving unit of the device is a self-contained mechanism wherein the armature shaft 41 of the motor extends through an oil seal 42 and bearing 43, so that the pinion 44 (which may be formed as an integral part of the shaft 41), may project beyond the plate 32 of the speed reducing unit and mesh with a spur gear 45. The spur gear 45 is mounted on a countershaft 46 journaled in bearings 47 and 48 on the plates 31 and 32 respectively. The countershaft 46 has an integral pinion 49 meshing with the ring gear 21. Thus, when the motor is energized, the gears 44, 45 and 47 are driven to bring about rotation of the drum 10.

The interior of the drum 10 is divided into an oil housing 51 and a motor compartment 52 by an interior plate or bulkhead 53, which is welded in position at an intermediate point between the end plates 11 and 12. The motor compartment 52 is preferably provided with a number of apertures 54 to provide adequate ventilation for the motor and as illustrated, the motor is provided with a semi-circular hood 55 secured to the supporting plate 35 thereof to shield the armature shaft from any foreign substances that might enter the motor compartment through the ventilating openings. The oil housing 51 of the drum may be provided with a removable filler and drain plug 56 as indicated.

The driving unit of the device is supported primarily on a center bearing 57 in the bulkhead 53, and it will be seen from Figures 1 and 5 that this bearing surrounds the sleeve 34 and supports the speed reducing unit in such a manner that the torque shaft 38 thereof may project outwardly through the hollow journal 15 and through the hub 58 to a torque arm 59 which serves to restrain the driving unit against rotation within the drum. The shaft is connected to the arm by a coil spring 61 anchored to the shaft at 62 and secured to the arm by the cap screw 63 so as to cushion any torque stresses.

In the form of the invention illustrated, the torque arm 59 has its lower end portion arranged to bear against a plunger 64 (Figure 2), which is provided with a reduced piston portion 65 slidable in a hydraulic cylinder 66 and having oil seals 67 therein. The interior of the cylinder 66 has a port 68 communicating with a conventional pressure gauge 69 which registers the pressure imposed on oil within the cylinder by the torque arm 59. Thus, the dial of the pressure gauge 69 may be calibrated to register the weight of the material being brought up the conveyor belt, so that the gauge will not only give an indication of any dangerous overloading which might occur, but will also function as a constant weighing device whereby the weight of material handled on the conveyor may be determined. An anti-friction bearing 60 is preferably provided within the hub 13 as shown, and oil seals 81 and 82 are provided at the outer end of the journal 15 and at the center bearing 57 of the bulkhead 32 respectively, so that the entire speed reducing unit is suspended in an oil bath, and secured between the bearings 57 and 60. The motor 36 is mounted in outboard relationship to the speed reducing unit and supported wholly upon the sleeve 34 thereof, but is in a separate ventilated compartment of the drum. It is, however, held against rotation by the threaded connection with the sleeve 34, which tightens in response to motor torque. Thus, the motor may conveniently be energized by electrical leads 71 extending outwardly through the hollow hub and journal 16 at the right hand end of the device and, as shown, these leads may be closed within a stationary conduit 72 mounted on a suitable bracket 73.

From the above it will be apparent that, since the motor housing does not rotate, the use of collector rings and brushes outside of the drum is entirely unnecessary. Moreover, it is to be observed that motorized pulleys of this design do not impose any torque forces on the bearing structures which carry them, and do not bring about any twisting strains which might tend to flex the frames on which the bearings are mounted. It follows that these pulleys cannot tend to cause misalignment of their bearings even under the most severe conditions of loading, and that they are therefore of such design and construction that they require no special bearings or mountings, but may be journaled in bearings of conventional construction, without special reinforcements or strengthening of the bearings themselves or of their mounting frames.

The internal driving mechanisms of the pulleys are of such construction and so related to the other parts of the pulley that they are subject to torque loads only, and are not at any time subject to any shock or lateral load such as may be imposed on the pulley by the tension of the conveyor belt thereon. This largely eliminates the cause of most alignment difficulties and avoids unnecessary friction, thus reducing wear in the operating parts of the unit.

The motor of the driving unit is supported wholly on the speed reducer by a relatively small threaded sleeve, so that these sections of the driving unit may be isolated by an oil seal and baffle within the pulley drum, yet so that the entire driving unit may be supported at two points only, and well balanced on its supports. With this arrangement these parts are to a certain extent self-aligning and not unduly affected by minor inaccuracies of alignment of the coacting parts of the pulley drum or journals, which has often been extremely troublesome in units of prior art design.

In conclusion, it is submitted that the present invention provides a motorized pulley wherein the pulley drum, end plates and journals operate as a single rigid unitary structure, and thus function as the equivalent of a conventional drum and axle in that these parts support the entire lateral load imposed upon the pulley, while the driving unit is subject to no lateral load whatsoever, but carries only the torque load to which the pulley is subjected. Thus the frame of the pulley "packs the load" so to speak, and leaves the driving unit free of unnecessary friction and capable of developing the high degree of torque required in heavy duty equipment.

Having thus described my invention, what I claim as new and desire to secure by United States Letters Patent is:

1. In a motorized pulley of the type having an exterior rotatable drum and a stationary driving motor housed therein, means for relieving the motor shaft from lateral loads imposed upon the drum comprising, in combination, a pair of end plates each rigidly secured to the drum and having a central hub therein, with hollow stub shafts fixed on the end plates and projecting outwardly from the hubs thereof; together with a free floating driving unit within said drum and a transverse bulkhead between the end plates of the drum supporting said driving unit; the driving unit comprising a speed reducer having a frame consisting of a pair of end plates carrying a torque shaft and motor mounting sleeve respectively, with a countershaft extending between said end plates and having a gear and pinion thereon; the said torque shaft extending through one of said stub shafts and the sleeve extending through the bulkhead and supporting an electric motor fixedly mounted on the end of the sleeve in outboard relationship with the speed reducer and on the other side of the bulkhead therefrom, whereby all lateral forces imposed on the pulley drum are borne directly by the stub shafts, and said motor and speed reducer are self-aligning and wholly free of lateral strains.

2. In a motorized pulley of the type having an exterior rotatable drum and a stationary driving motor housed therein, means for relieving the motor shaft from lateral loads imposed upon the drum comprising, in combination, a pair of end plates each rigidly secured to the drum and having a central hub therein, with hollow stub shafts fixed on the end plates and projecting outwardly from the hubs thereof; together with a free floating driving unit within said drum and a transverse bulkhead between the end plates of the drum supporting said driving unit; the driving unit comprising a speed reducer having a frame carrying a torque shaft and motor mounting sleeve respectively, the said torque shaft extending through one of said stub shafts and the sleeve extending through the bulkhead and supporting an electric motor fixedly mounted on the end of the sleeve in outboard relationship with the speed reducer and on the other side of the bulkhead therefrom, whereby all lateral forces imposed on the pulley drum are borne directly by the stub shafts, and said motor and speed reducer are self-aligning and wholly free of lateral strains.

3. In a motorized pulley, a load supporting frame comprising an exterior drum with end plates rigidly fixed thereto at each end thereof and hollow journal shafts fixedly secured to the center portions of said end plates and projecting outwardly in opposite directions therefrom, whereby said frame of the pulley is adapted to be mounted for rotation in conventional bearings at each end of the drum; a transverse bulkhead between the ends of said drum, with a stationary internal driving unit consisting of an electric motor and a speed reducer within said drum and having a stationary torque shaft projecting therefrom at one end and a threaded sleeve projecting therefrom at the opposite end, with an electric motor threaded on said sleeve and supported solely thereby, with the armature shaft of the motor extending through said sleeve to the speed reducer and with said speed reducer being geared to said drum; said sleeve extending through and being supported by a central bearing in said bulkhead; with the aforementioned torque shaft extending through one of the journal shafts and pulley bearings and secured to a torque arm having its outer end anchored to restrain the driving unit against rotation.

DANIEL A. SCHROCK.

REFERENCES CITED

The following references are of record in the file of this patent:

UNITED STATES PATENTS

| Number | Name | Date |
|---|---|---|
| 1,313,537 | Jones | Aug. 19, 1919 |
| 1,323,245 | Borkes | Dec. 2, 1919 |
| 2,540,099 | Christian | Feb. 6, 1951 |